United States Patent
Torita et al.

(10) Patent No.: US 11,387,461 B2
(45) Date of Patent: Jul. 12, 2022

(54) POSITIVE ELECTRODE, NON-AQUEOUS ELECTROLYTE SECONDARY BATTERY, AND METHOD OF PRODUCING POSITIVE ELECTRODE

(71) Applicant: TOYOTA JIDOSHA KABUSHIKI KAISHA, Toyota (JP)

(72) Inventors: Koji Torita, Nagoya (JP); Akihiro Ochiai, Toyonaka (JP); Yusuke Fukumoto, Toyonaka (JP); Harunari Shimamura, Toyonaka (JP); Takuya Asari, Osaka (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 433 days.

(21) Appl. No.: 16/292,562

(22) Filed: Mar. 5, 2019

(65) Prior Publication Data
US 2019/0280305 A1    Sep. 12, 2019

(30) Foreign Application Priority Data
Mar. 6, 2018 (JP) .............................. JP2018-039786

(51) Int. Cl.
*H01M 4/66* (2006.01)
*H01M 4/131* (2010.01)
(Continued)

(52) U.S. Cl.
CPC ........... *H01M 4/667* (2013.01); *H01M 4/043* (2013.01); *H01M 4/131* (2013.01);
(Continued)

(58) Field of Classification Search
CPC ...... H01M 4/667; H01M 4/043; H01M 4/131; H01M 4/1391; H01M 4/366; H01M 4/485;
(Continued)

(56) References Cited

U.S. PATENT DOCUMENTS

| 5,162,175 A | 11/1992 | Visco et al. |
| 8,958,197 B2 * | 2/2015 | Kondou ................. H01G 11/28 361/502 |

(Continued)

FOREIGN PATENT DOCUMENTS

| EP | 1179751 A2 * | 2/2002 | ............. G03G 5/144 |
| JP | 2000-048822 A | 2/2000 | |

(Continued)

OTHER PUBLICATIONS https://doi.org/10.1002/0471238961.0825041813091918.a01.pub2, aluminum oxide hydrate (Year: 2003).*

*Primary Examiner* — Helen Oi K Conley
(74) *Attorney, Agent, or Firm* — Sughrue Mion, PLLC

(57) ABSTRACT

A positive electrode includes at least a positive electrode current collector, a conductive material, and a positive electrode active material. The positive electrode active material is disposed on a surface of the positive electrode current collector. The positive electrode current collector includes an aluminum foil and an aluminum oxide hydrate film. The aluminum oxide hydrate film covers a surface of the aluminum foil. The aluminum oxide hydrate film has a thickness not smaller than 10 nm and not greater than 500 nm. The aluminum oxide hydrate film has a porosity not lower than 10% and not higher than 50%. At least part of the conductive material is disposed within pores in the aluminum oxide hydrate film.

10 Claims, 5 Drawing Sheets

(51) Int. Cl.
*H01M 4/525* (2010.01)
*H01M 4/36* (2006.01)
*H01M 4/62* (2006.01)
*H01M 4/485* (2010.01)
*H01M 4/04* (2006.01)
*H01M 4/1391* (2010.01)
*H01M 10/0525* (2010.01)
*H01M 10/42* (2006.01)
*H01M 4/02* (2006.01)

(52) U.S. Cl.
CPC ......... *H01M 4/1391* (2013.01); *H01M 4/366* (2013.01); *H01M 4/485* (2013.01); *H01M 4/525* (2013.01); *H01M 4/624* (2013.01); *H01M 4/625* (2013.01); *H01M 4/626* (2013.01); *H01M 4/661* (2013.01); *H01M 4/664* (2013.01); *H01M 10/0525* (2013.01); *H01M 10/4235* (2013.01); *H01M 2004/028* (2013.01)

(58) Field of Classification Search
CPC ...... H01M 4/525; H01M 4/624; H01M 4/625; H01M 4/626; H01M 4/661; H01M 4/664; H01M 10/0525; H01M 10/4235
See application file for complete search history.

(56) References Cited

U.S. PATENT DOCUMENTS

| | | |
|---|---|---|
| 2008/0318130 A1 | 12/2008 | Ogawa et al. |
| 2013/0003260 A1 | 1/2013 | Kondou et al. |
| 2016/0093922 A1 | 3/2016 | Endo et al. |
| 2017/0352866 A1* | 12/2017 | Kawai ................. H01M 4/0416 |
| 2020/0020951 A1* | 1/2020 | Furusawa ............. H01M 4/131 |

FOREIGN PATENT DOCUMENTS

| | | |
|---|---|---|
| JP | 2008-103132 A | 5/2008 |
| JP | 2011-228684 A | 11/2011 |
| JP | 2015-109214 A | 6/2015 |
| JP | 2016-072221 A | 5/2016 |
| JP | 2017220467 A | 12/2017 |

* cited by examiner

POSITIVE ELECTRODE, NON-AQUEOUS ELECTROLYTE SECONDARY BATTERY, AND METHOD OF PRODUCING POSITIVE ELECTRODE

This nonprovisional application is based on Japanese Patent Application No. 2018-039786 filed on Mar. 6, 2018, with the Japan Patent Office, the entire contents of which are hereby incorporated by reference.

BACKGROUND

Field

The present disclosure relates to a positive electrode, a non-aqueous electrolyte secondary battery, and a method of producing a positive electrode.

Description of the Background Art

Japanese Patent Laying-Open No. 2016-072221 discloses an arrangement in which an insulating-particle-containing intermediate layer is interposed between a positive electrode current collector and a positive electrode active material.

SUMMARY

An insulating-particle-containing intermediate layer, if interposed between the positive electrode current collector and the positive electrode active material in a battery, is expected to decrease heat generation that occurs in the battery upon a short circuit caused by, for example, an impact exerted from outside the battery (hereinafter, the impact is also called "external input"). The external input can be simulated by a nail penetration test, for example.

The intermediate layer is formed by applying insulating particles to a surface of the positive electrode current collector. The intermediate layer does not contribute to an enhancement of battery capacity, and therefore it is desirable that the intermediate layer be thin. Inconveniently, however, a thin intermediate layer is considered to be difficult to form by application of insulating particles. For example, if the intermediate layer is formed as thin as the particle size of individual insulating particles, it is considered that the insulating particles are sparsely distributed and consequently the heat-generation-reducing effect of the intermediate layer decreases. To solve this problem, the size of the insulating particles can be made smaller. However, the smaller the insulating particles are, the more readily the particles agglomerate together. The agglomeration is considered to lead to a sparse distribution of the insulating particles.

An object of the present disclosure is to reduce heat generation that occurs in a battery upon a short circuit caused by, for example, an impact exerted from outside the battery.

In the following, the technical structure and the effects according to the present disclosure are described. It should be noted that part of an action mechanism according to the present disclosure is based on presumption. Therefore, the scope of claims should not be limited by whether or not the action mechanism is correct.

[1] A positive electrode according to the present disclosure is a positive electrode for a non-aqueous electrolyte secondary battery. The positive electrode includes at least a positive electrode current collector, a conductive material, and a positive electrode active material. The positive electrode active material is disposed on a surface of the positive electrode current collector. The positive electrode current collector includes an aluminum foil and an aluminum oxide hydrate film. The aluminum oxide hydrate film covers a surface of the aluminum foil. The aluminum oxide hydrate film has a thickness not smaller than 10 nm and not greater than 500 nm. The aluminum oxide hydrate film has a porosity not lower than 10% and not higher than 50%. At least part of the conductive material is disposed within pores that are formed in the aluminum oxide hydrate film.

The aluminum (Al) oxide hydrate film is a ceramic film. The Al oxide hydrate film may be an insulating film. Interposing the Al oxide hydrate film between the aluminum (Al) foil and the positive electrode active material is expected to lead to a decrease in heat generation that occurs upon a short circuit caused by an external input. Hereinafter, the expression "upon a short circuit caused by an external input" may be simply described as "upon a short circuit".

The Al oxide hydrate film may be formed by, for example, hydrothermal treatment of the Al foil. Because it is dense, the Al oxide hydrate film even with a thickness not greater than 500 nm is expected to exhibit a sufficient level of heat-generation-reducing effect. When the thickness is smaller than 10 nm, however, retaining the denseness is considered to be difficult and therefore the heat-generation-reducing effect can decrease. Here, it is considered that an Al oxide hydrate film with a thickness not smaller than 10 nm is not formed by spontaneous oxidation of an Al foil in the atmosphere.

The Al oxide hydrate film is porous. Within the Al oxide hydrate film, pores are formed. Within the pores, the conductive material is disposed. With the conductive material thus disposed within the pores, electronic conduction can be established between the positive electrode active material and the aluminum foil. Therefore, it is considered that the positive electrode according to the present disclosure reduces heat generation occurring upon a short circuit and additionally ensures a predetermined level of output.

It should be noted that the porosity of the Al oxide hydrate film is not lower than 10% and not higher than 50%. When the porosity is lower than 10%, it is considered to be difficult to have the conductive material disposed within the pores and therefore output can decrease. When the porosity is higher than 50%, retaining the denseness is considered to be difficult and therefore the heat-generation-reducing effect can decrease.

[2] At least part of the conductive material may extend from the positive electrode active material through the pores in the aluminum oxide hydrate film to reach the aluminum foil.

With the conductive material thus extending and being in contact with both the positive electrode active material and the Al foil, a stable electronic conduction path is expected to be established between the positive electrode active material and the Al foil.

[3] The aluminum oxide hydrate film may have a composition represented by the following formula (I):

$$Al_2O_3 \cdot nH_2O \tag{I}$$

where n satisfies $0 < n \leq 1$.

As shown in the above formula (I), the Al oxide hydrate film contains water of crystallization ($H_2O$). When heat generation occurs in the battery, the Al oxide hydrate film is expected to release water of crystallization and thus reduce the heat generation. The compound of the formula (I) where n=1 is called "boehmite". The compound of the formula (I) where n=0 is called "alumina". It is considered that the hardness, the porosity, and other properties of the Al oxide hydrate film can be changed by changing the value of n. For example, it is expected that the greater the value of n is, the softer the Al oxide hydrate film is and the less likely the formation of large cracks is to occur during a compression process.

[4] In the above formula (I), n may satisfy $0.7 \leq n < 1$. When n is not smaller than 0.7, an increased level of heat-generation-reducing effect is expected to be obtained. When n is smaller than 1, the denseness of the Al oxide hydrate film is expected to be improved.

[5] The aluminum oxide hydrate film may have a thickness not smaller than 50 nm and not greater than 300 nm.

When the thickness is not smaller than 50 nm, an increased level of heat-generation-reducing effect is expected to be obtained. When the thickness is not greater than 300 nm, the output is expected to be improved.

[6] The positive electrode active material may contain a lithium-nickel composite oxide.

A lithium-nickel composite oxide is a positive electrode active material that is expected to exhibit a high output. When a lithium-nickel composite oxide is used, however, the amount of heat that is generated upon a short circuit tends to be great. Here, the heat generation that occurs upon a short circuit can be reduced when the positive electrode according to the present disclosure is used. Therefore, by using the positive electrode according to the present disclosure that includes a lithium-nickel composite oxide, a high output is expected to be obtained while heat generation that occurs upon a short circuit is reduced.

[7] A non-aqueous electrolyte secondary battery according to the present disclosure includes at least the positive electrode according to any one of [1] to [6] above. In the non-aqueous electrolyte secondary battery according to the present disclosure, the level of heat generation that occurs upon a short circuit is expected to be low.

[8] A method of producing a positive electrode according to the present disclosure is a method of producing a positive electrode for a non-aqueous electrolyte secondary battery.

The method of producing a positive electrode according to the present disclosure includes at least the following (a) to (d):

(a) preparing an aluminum (Al) foil;

(b) forming an aluminum (Al) oxide hydrate film on a surface of the aluminum foil by hydrothermal treatment to form a positive electrode current collector;

(c) disposing a conductive material and a positive electrode active material on a surface of the positive electrode current collector; and (d) after the disposition of the conductive material and the positive electrode active material, compressing the conductive material, the positive electrode active material, and the positive electrode current collector together.

The compressed aluminum oxide hydrate film has a thickness not smaller than 10 nm and not greater than 500 nm. The compressed aluminum oxide hydrate film has a porosity not lower than 10% and not higher than 50%. By the compressing, at least part of the conductive material is disposed within pores that are formed in the aluminum oxide hydrate film.

By the method of producing a positive electrode according to the present disclosure, the positive electrode according to any one of [1] to [5] above may be produced. By the hydrothermal treatment, the Al oxide hydrate film is formed. It is considered that the hydrothermal treatment renders the resulting Al oxide hydrate film porous. After the conductive material and the positive electrode active material are disposed on a surface of the Al oxide hydrate film, the compression is carried out. By the compression, the thickness of the Al oxide hydrate film is adjusted. Also by the compression, at least part of the conductive material is considered to fall into the pores in the Al oxide hydrate film; more specifically, the conductive material is considered to be disposed within the pores in the Al oxide hydrate film. With the conductive material thus disposed within the pores in the Al oxide hydrate film, an electronic conduction path is considered to be established between the positive electrode active material and the Al foil.

[9] The conductive material, the positive electrode active material, and the positive electrode current collector may be compressed together so that at least part of the conductive material extends from the positive electrode active material through the pores in the compressed aluminum oxide hydrate film to reach the aluminum foil.

It is expected that this configuration establishes a stable electronic conduction path between the positive electrode active material and the Al foil.

The foregoing and other objects, features, aspects and advantages of the present disclosure will become more apparent from the following detailed description of the present disclosure when taken in conjunction with the accompanying drawings.

DESCRIPTION OF THE PREFERRED EMBODIMENTS

In the following, embodiments according to the present disclosure (herein called "present embodiment") are described. The scope of claims is not limited to the description below. For example, the below description is mainly on a lithium-ion secondary battery but a lithium-ion secondary battery is merely an example of the non-aqueous electrolyte secondary battery according to the present embodiment. As long as it includes a non-aqueous electrolyte, the non-aqueous electrolyte secondary battery according to the present embodiment is not limited to a lithium-ion secondary battery. For example, the non-aqueous electrolyte secondary battery according to the present embodiment may be a sodium-ion secondary battery.

<Positive Electrode>

Figure 1:
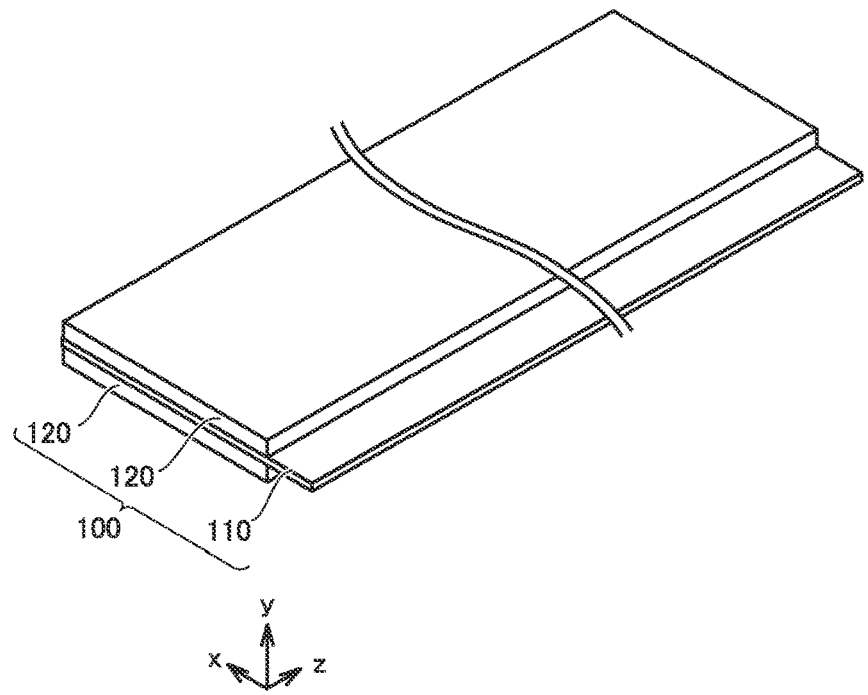
FIG. 1 is a schematic view illustrating the structure of the positive electrode according to the present embodiment.

FIG. 1 is a schematic view illustrating the structure of the positive electrode according to the present embodiment.

Figure 4:
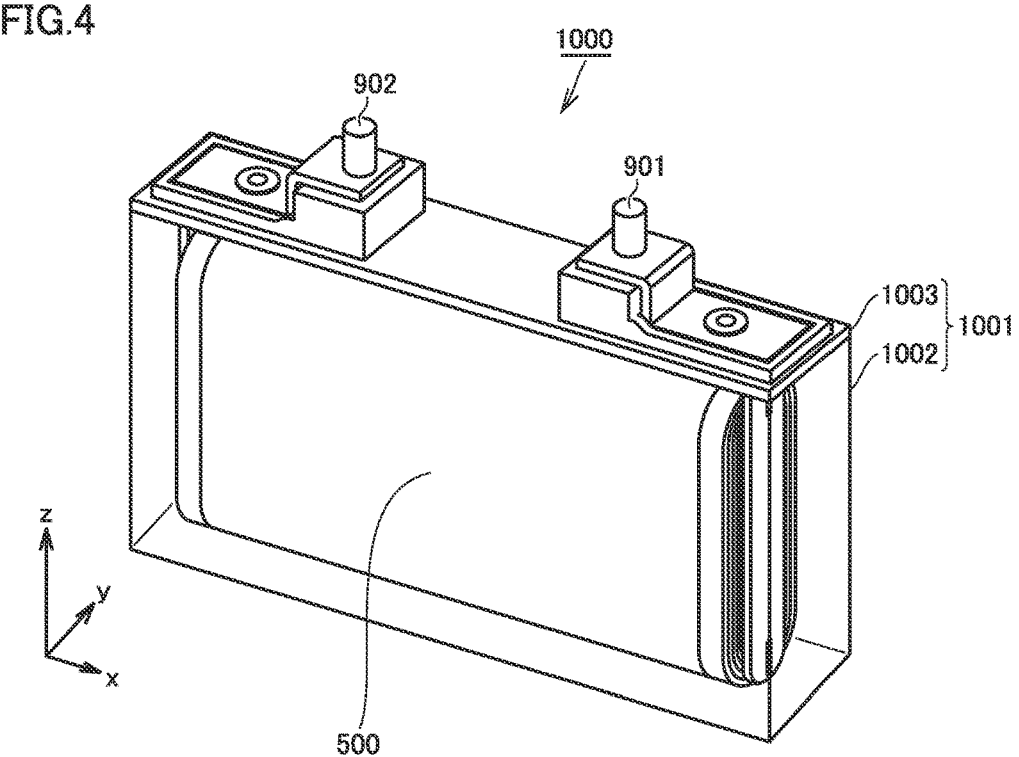
FIG. 4 is a schematic view illustrating the structure of the non-aqueous electrolyte secondary battery according to the present embodiment.

A positive electrode 100 is a positive electrode for a non-aqueous electrolyte secondary battery. The non-aqueous electrolyte secondary battery is described below in detail. Positive electrode 100 is in sheet form. Positive electrode 100 includes a positive electrode current collector 110 and a positive electrode composite material layer 120. Positive electrode composite material layer 120 is formed on a surface of positive electrode current collector 110. Positive electrode composite material layer 120 may be formed on both sides of positive electrode current collector 110. The part of positive electrode current collector 110 protruding from positive electrode composite material layer 120 in the x-axis direction in FIG. 1 may be used for connection to a positive electrode terminal 901 (FIG. 4).

Figure 2:
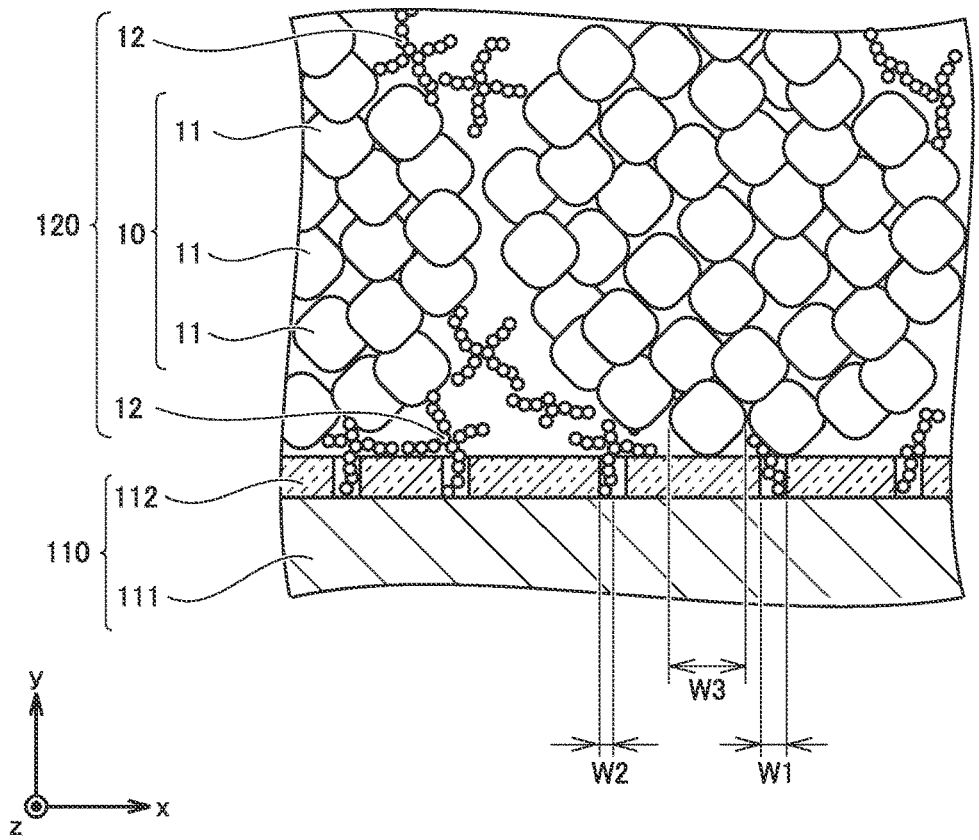
FIG. 2 is a conceptual sectional view illustrating the structure of the positive electrode according to the present embodiment.

FIG. 2 is a conceptual sectional view illustrating the structure of the positive electrode according to the present embodiment.

FIG. 2 conceptually shows the interface between positive electrode current collector 110 and positive electrode composite material layer 120 as well as the area around the interface. An image (an SEM image of a cross section) like the one in FIG. 2 is obtained by, for example, electron microscopy (SEM) of a cross-sectional sample of positive electrode 100. Positive electrode composite material layer 120 contains a positive electrode active material 10 and a conductive material 12. Positive electrode active material 10 is disposed on a surface of positive electrode current collector 110.

<<Positive Electrode Current Collector>>

Positive electrode current collector 110 includes an aluminum (Al) foil 111 and an aluminum (Al) oxide hydrate film 112. Al oxide hydrate film 112 covers a surface of Al foil 111. Desirably, Al oxide hydrate film 112 covers substantially the entire surface of Al foil 111. As long as heat generation occurring upon a short circuit can be reduced, however, part of the surface of Al foil 111 may be not covered with Al oxide hydrate film 112.

(Aluminum Foil)

The expression "Al foil 111 according to the present embodiment" includes a pure Al foil and an Al alloy foil. In other words, Al foil 111 may be a pure Al foil or an Al alloy foil. Al foil 111 contains Al in an amount not lower than 99 mass %, for example. Al foil 111 may also contain a trace amount of impurities that are inevitably entrapped during production. Al foil 111 may also contain an additive element. The additive element may be silicon (Si), iron (Fe), copper (Cu), manganese (Mn), magnesium (Mg), zinc (Zn), and/or titanium (Ti), for example.

As Al foil 111, a sheet of a material or materials specified by Alloy Nos. 1085, 1070, 1050, 1N30, 1100, 3003, 3004, 8021, and/or 8079 in "JIS H 4160: Aluminium and aluminium alloy foils" may be used, for example. Al foil 111 may have a thickness not smaller than 5 μm and not greater than 50 μm, for example. Al foil 111 may have a thickness not smaller than 10 μm and not greater than 20 μm, for example.

(Aluminum Oxide Hydrate Film)

Al oxide hydrate film 112 is an insulating film. Al oxide hydrate film 112 is considered to reduce heat generation that occurs upon a short circuit. Al oxide hydrate film 112 is a thin film with a size of the order of submicrons to nanometers. More specifically, Al oxide hydrate film 112 has a thickness not smaller than 10 nm and not greater than 500 nm. When Al oxide hydrate film 112 is a thin film, a decrease in battery capacity may be reduced.

The "thickness of Al oxide hydrate film 112" is measured in an SEM image of a cross section of Al oxide hydrate film 112. The cross section of Al oxide hydrate film 112 refers to a cross section substantially parallel to the thickness direction (the y-axis direction in FIG. 2) of Al oxide hydrate film 112. The expression "(the cross section is) substantially parallel to the thickness direction" means that the angle formed between the cross section and the thickness direction is not smaller than 0 degree and not greater than 10 degrees. The cross-sectional sample may be prepared by using a cross section polisher apparatus (CP) or a focused ion beam apparatus (FIB), for example. The magnification of the image may be changed, as appropriate, depending on the thickness of Al oxide hydrate film 112. The magnification of the image may be not lower than 10,000 times and not higher than 200,000 times, for example. The thickness is measured at 20 positions. The arithmetic mean of these 20 thickness measurements is used. Desirably, the distance between these 20 positions is not smaller than 100 nm, for example.

Because Al oxide hydrate film 112 is dense, Al oxide hydrate film 112 even with a thickness not greater than 500 nm is expected to exhibit a sufficient level of heat-generation-reducing effect. When the thickness of Al oxide hydrate film 112 is smaller than 10 nm, however, retaining the denseness is considered be difficult and therefore the heat-generation-reducing effect can decrease.

Al oxide hydrate film 112 may have a thickness not smaller than 50 nm and not greater than 300 nm. When the thickness is not smaller than 50 nm, an increased level of heat-generation-reducing effect is expected to be obtained. When the thickness is not greater than 300 nm, the output is expected to be improved. Al oxide hydrate film 112 may have a thickness not smaller than 100 nm, for example. Al oxide hydrate film 112 may have a thickness not greater than 200 nm, for example.

Al oxide hydrate film 112 is porous. Al oxide hydrate film 112 has pores formed therein. The pores may be formed during the process of formation and compression of Al oxide hydrate film 112. Within the pores, at least part of conductive material 12 is disposed. With at least part of conductive material 12 thus disposed within the pores, it is considered that electronic conduction can be established between positive electrode active material 10 and Al foil 111. At least part of conductive material 12 may extend from positive electrode active material 10 through the pores in Al oxide hydrate film 112 to reach Al foil 111. This configuration is expected to establish a stable electronic conduction path between positive electrode active material 10 and Al foil 111.

Al oxide hydrate film 112 has a porosity not lower than 10% and not higher than 50%. The "porosity of Al oxide hydrate film 112" is measured in an SEM image of a cross section of Al oxide hydrate film 112. The SEM image of a cross section is prepared in the same manner as in the thickness measurement. By processing the SEM image of a cross section, the entire area of Al oxide hydrate film 112 and the total area of the pores in Al oxide hydrate film 112 are measured. By dividing the total area of the pores by the entire area of Al oxide hydrate film 112, the porosity is calculated. The porosity is measured in at least five SEM images of cross sections. The arithmetic mean of these at least five measurements is used. Desirably, the at least five cross sections used in the above measurement are spaced from each other by a distance not smaller than 10 μm.

When the porosity is lower than 10%, it is considered to be difficult to have conductive material 12 disposed within the pores and therefore output can decrease. When the porosity is higher than 50%, retaining the denseness is considered to be difficult and therefore the heat-generation-reducing effect can decrease. Al oxide hydrate film 112 may have a porosity not lower than 23%, for example. Al oxide hydrate film 112 may have a porosity not lower than 35%, for example. Al oxide hydrate film 112 may have a porosity not higher than 45%, for example. Al oxide hydrate film 112 may have a porosity not higher than 40%, for example.

Desirably, each pore in the SEM image of a cross section has a width ("W1" in FIG. 2) that is greater than the width of conductive material 12 ("W2" in FIG. 2) and is smaller than the width of positive electrode active material 10 ("W3" in FIG. 2). In other words, it is desirable that the following relationship be satisfied: W2<W1<W3. It is considered that this configuration substantially exclusively allows conductive material 12 to enter the pores and does not allow positive electrode active material 10 to enter the pores. With this configuration in which positive electrode active material 10 and Al foil 111 are not in direct contact with each other, the heat-generation-reducing effect is expected to increase.

In the above width measurement, the direction of each of W1, W2, and W3 is substantially vertical to the thickness direction of Al oxide hydrate film 112 (in other words, each width is a width in the x-axis direction in FIG. 2). The expression "(the direction of the width is) substantially vertical to the thickness direction" means that the angle formed between the direction of the width and the thickness direction is not smaller than 85 degrees and not greater than 95 degrees. When conductive material 12 is carbon black, the width of conductive material 12 refers to the diameter of a domain (particle) of the carbon black. Each domain may have a diameter not smaller than 1 nm and not greater than 10 nm, for example. When positive electrode active material 10 is in the form of secondary particles, the width of positive electrode active material 10 refers to the diameter of primary particles 11. Primary particles 11 may have a diameter not smaller than 200 nm and not greater than 3 µm, for example.

Al oxide hydrate film 112 may originate from Al foil 111. Al oxide hydrate film 112 may be made substantially solely of an Al oxide hydrate. In other words, Al oxide hydrate film 112 may be a film that contains substantially no binder. A typical intermediate layer formed by coating (see Japanese Patent Laying-Open No. 2016-072221) requires a binder. When Al oxide hydrate film 112 contains no binder, material efficiency is expected to be improved.

The composition of Al oxide hydrate film 112 may be identified by X-ray diffraction (XRD) and/or X-ray fluorescence analysis (XRF), for example. The composition of Al oxide hydrate film 112 may be represented by, for example, the following formula (I):

$$Al_2O_3 \cdot nH_2O \qquad (I)$$

where n satisfies 0<n≤1.

As shown in the above formula (I), Al oxide hydrate film 112 contains water of crystallization ($H_2O$). When heat generation occurs in the battery, Al oxide hydrate film 112 is expected to release water of crystallization and reduce the heat generation. In the above formula (I), n may satisfy 0.7≤n<1. When n is not smaller than 0.7, an increased level of heat-generation-reducing effect is expected to be obtained. When n is smaller than 1, the denseness of Al oxide hydrate film 112 is expected to be improved. It is considered that the porosity of Al oxide hydrate film 112 can be adjusted by changing the value of n.

<<Positive Electrode Composite Material Layer>> 

Positive electrode composite material layer 120 may have a thickness not smaller than 10 µm and not greater than 200 µm, for example. Positive electrode composite material layer 120 may have a thickness not smaller than 100 µm and not greater than 200 µm, for example. Positive electrode composite material layer 120 may have a density not lower than 3.0 g/cm³ and not higher than 4.0 g/cm³, for example. Positive electrode composite material layer 120 may have a density not lower than 3.5 g/cm³ and not higher than 3.9 g/cm³, for example. Positive electrode composite material layer 120 contains at least positive electrode active material 10. Positive electrode composite material layer 120 may further contain conductive material 12 and a binder (not shown). More specifically, conductive material 12 contained in positive electrode composite material layer 120 is part of conductive material 12. As described above, at least part of conductive material 12 is disposed within the pores in Al oxide hydrate film 112.

(Positive Electrode Active Material)

Positive electrode active material 10 occludes and releases charge carriers. The charge carriers according to the present embodiment are lithium ions. Positive electrode active material 10 is typically in the form of secondary particles (agglomerates of primary particles 11). The secondary particles may have a d50 not lower than 3 µm and not higher than 30 µm, for example. The "d50" refers to the particle size in particle size distribution obtained by laser diffraction and scattering at which the cumulative particle volume (accumulated from the side of small sizes) reaches 50% of the total particle volume.

Positive electrode active material 10 is not particularly limited. Positive electrode active material 10 may have any of various crystal structures. The crystal structure of positive electrode active material 10 may be identified by XRD, for example. Positive electrode active material 10 may have a crystal structure of a lamellar rock salt type, a spinel type, or an olivine type, for example. Positive electrode active material 10 may contain a lithium-cobalt composite oxide (such as $LiCoO_2$), a lithium-manganese composite oxide (such as $LiMn_2O_4$ and $LiMnO_2$), and/or a lithium phosphate (such as $LiFePO_4$), for example. Positive electrode active material 10 may contain substantially one type of these compounds. Positive electrode active material 10 may contain two or more types of these compounds.

Positive electrode active material 10 may contain a lithium-nickel composite oxide. The lithium-nickel composite oxide may have a crystal structure of a lamellar rock salt type, for example. The lithium-nickel composite oxide is a positive electrode active material that is expected to exhibit a high output. When a lithium-nickel composite oxide is used, however, the amount of heat that is generated upon a short circuit tends to be great. Here, as described above, the heat generation that occurs upon a short circuit can be reduced when positive electrode 100 according to the present embodiment is used. Therefore, by using positive electrode 100 according to the present embodiment that includes a lithium-nickel composite oxide, a high output is expected to be obtained while heat generation occurring upon a short circuit is reduced.

The composition of the lithium-nickel composite oxide may be identified by inductively coupled plasma atomic emission spectroscopy (ICP-AES), for example. The composition of the lithium-nickel composite oxide may be represented by, for example, the following formula (II):

$$LiNi_xM_{1-x}O_2 \qquad (II)$$

where x satisfies 1/3≤x≤1 and 

M is at least one selected from the group consisting of Co, Mn, and Al.

Examples of the lithium composite oxide represented by the above formula (II) include $LiNi_{1/3}Co_{1/3}Mn_{1/3}O_2$, $LiNi_{0.4}Co_{0.3}Mn_{0.3}O_2$, $LiNi_{0.5}Co_{0.2}Mn_{0.3}O_2$, $LiNi_{0.5}Co_{0.3}Mn_{0.2}O_2$, $LiNi_{0.6}Co_{0.2}Mn_{0.2}O_2$, $LiNi_{0.6}Co_{0.3}Mn_{0.1}O_2$, $LiNi_{0.6}Co_{0.1}Mn_{0.3}O_2$, $LiNi_{0.7}Co_{0.2}Mn_{0.1}O_2$, $LiNi_{0.8}Co_{0.15}Al_{0.05}O_2$, $LiNi_{0.8}Co_{0.17}Al_{0.03}O_2$, and $LiNiO_2$.

(Conductive Material)

Conductive material 12 is electronically conductive. Conductive material 12 establishes an electronic conduction path. Conductive material 12 may be carbon black (such as acetylene black, furnace black, and/or thermal black) and/or carbon short fibers, for example. The content of conductive material 12 may be, for example, not lower than 0.1 part by mass and not higher than 10 parts by mass relative to 100 parts by mass of the positive electrode active material.

(Binder)

The binder binds positive electrode current collector 110 and positive electrode composite material layer 120 to each other. The binder binds the constituents of positive electrode composite material layer 120 to each other. The binder is not particularly limited. The binder may be polyvinylidene difluoride (PVdF), polytetrafluoroethylene (PTFE), carboxymethylcellulose (CMC), and/or polyacrylic acid (PAA), for example. One type of the binder may be used alone. Two or more types of the binder may be used in combination. The content of the binder may be, for example, not lower than 0.1 part by mass and not higher than 10 parts by mass relative to 100 parts by mass of the positive electrode active material.

<Method of Producing Positive Electrode>

Figure 3:
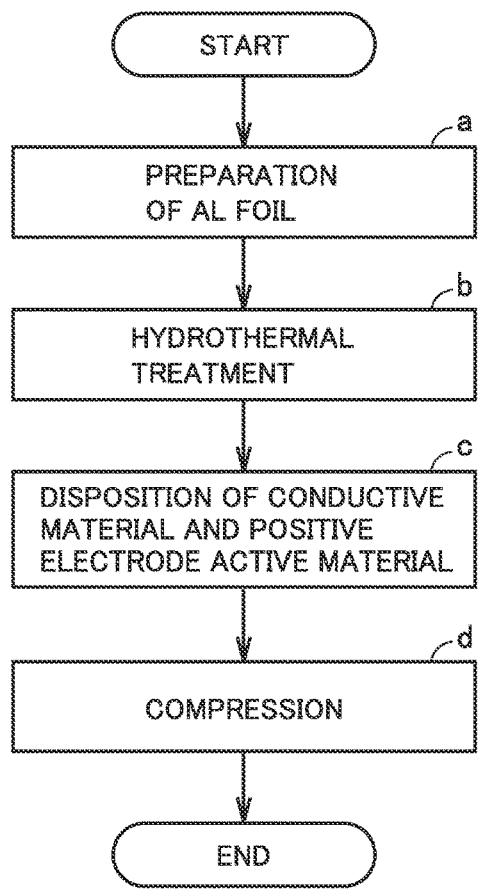
FIG. 3 is a flow chart schematically illustrating the method of producing a positive electrode according to the present embodiment.

Next, the method of producing a positive electrode according to the present embodiment is described. FIG. 3 is a flow chart schematically illustrating the method of producing a positive electrode according to the present embodiment. The method of producing a positive electrode according to the present embodiment includes at least "(a) preparation of the Al foil", "(b) hydrothermal treatment", "(c) disposition of the conductive material and the positive electrode active material", and "(d) compression".

<<(a) Preparation of Al Foil>>

The method of producing a positive electrode according to the present embodiment includes preparation of Al foil 111. Al foil 111 is described above in detail. Al foil 111 may be prepared by purchasing a commercial equivalent for Al foil 111, or Al foil 111 may be produced.

<<(b) Hydrothermal Treatment>>

The method of producing a positive electrode according to the present embodiment includes forming Al oxide hydrate film 112 on a surface of Al foil 111 by hydrothermal treatment to form positive electrode current collector 110.

A hydrothermal-treatment bath for use in hydrothermal treatment is prepared. To the hydrothermal-treatment bath, a hydrothermal-treatment liquid is added. The hydrothermal-treatment liquid may be water (such as ion-exchanged water), for example. When the hydrothermal-treatment liquid consists of water, it is considered that the resulting Al oxide hydrate film 112 is represented by the above formula (I) where n=1.

The hydrothermal-treatment liquid may be water to which at least one of an acid and an alkali is added. By adding an acid and/or an alkali, the amount of water of crystallization in Al oxide hydrate film 112 (more specifically, n in the above formula (I)) can be adjusted. For example, addition of sulfuric acid causes dehydration of Al oxide hydrate and thereby the resulting Al oxide hydrate film 112 may be represented by the above formula (I) where n is smaller than 1. By addition of sulfuric acid, the porosity of Al oxide hydrate film 112 can also be adjusted. The acid may be sulfuric acid, oxalic acid, and/or boric acid, for example. The alkali may be ammonium hydroxide, ammonium fluoride, and/or sodium hydroxide, for example. One type among the above acids and alkalis may be used alone. Two or more types among the above acids and alkalis may be used in combination. In other words, at least one selected from the group consisting of sulfuric acid, oxalic acid, boric acid, ammonium hydroxide, ammonium fluoride, and sodium hydroxide may be added to the hydrothermal-treatment liquid. The amount of the acid and/or the alkali added may be not lower than 1 mass % and not higher than 5 mass %, for example.

In the hydrothermal-treatment liquid, Al foil 111 is immersed. By changing the temperature of the hydrothermal-treatment liquid, the porosity of Al oxide hydrate film 112 can be adjusted. The higher the temperature is, the higher the porosity tends to be. The temperature of the hydrothermal-treatment liquid may be not lower than 70° C. and not higher than 100° C., for example. By changing the duration of the immersion, the thickness of Al oxide hydrate film 112 can be adjusted. The longer the duration of the immersion is, the thicker the resulting Al oxide hydrate film 112 tends to be. The duration of the immersion may be not shorter than 0.1 minute and not longer than 10 minutes, for example. Al oxide hydrate film 112 may be formed so as to have a pre-compression thickness not smaller than 18 nm and not greater than 900 nm, for example.

<<(c) Disposition of Conductive Material and Positive Electrode Active Material>>

The method of producing a positive electrode according to the present embodiment includes disposition of conductive material 12 and positive electrode active material 10 on a surface of positive electrode current collector 110. Conductive material 12 and positive electrode active material 10 are described above in detail. The method of disposing conductive material 12 and positive electrode active material 10 is not particularly limited. For example, a paste containing conductive material 12 and positive electrode active material 10 may be applied to a surface of positive electrode current collector 110 and then dried. By the paste application and drying, positive electrode composite material layer 120 may be formed. Positive electrode composite material layer 120 may be formed in a predetermined region on a surface of positive electrode current collector 110 so as to meet the specification of a battery 1000 (FIG. 4).

<<(d) Compression>>

The method of producing a positive electrode according to the present embodiment includes compressing conductive material 12, positive electrode active material 10, and positive electrode current collector 110 together after the disposition of conductive material 12 and positive electrode active material 10. The compression may be carried out with rollers, for example.

The compression is carried out so that the following conditions (i) to (iii) are satisfied:

(i) the compressed Al oxide hydrate film 112 has a thickness not smaller than 10 nm and not greater than 500 nm;

(ii) the compressed Al oxide hydrate film 112 has a porosity not lower than 10% and not higher than 50%; and (iii) by the compression, at least part of conductive material 12 is disposed within the pores in Al oxide hydrate film 112.

The conditions of the rollers, such as the linear pressure and the roller gap, are adjusted to suit the pre-compression thickness and the pre-compression porosity of Al oxide hydrate film 112. The linear pressure may be adjusted to fall within the range from 10 t/cm to 11 t/cm, for example. The compression ratio of Al oxide hydrate film 112 may be not lower than 0.5 and not higher than 0.91, for example. The "compression ratio" refers to a value obtained by dividing the post-compression thickness by the pre-compression thickness. The compression may be carried out so that at least part of conductive material 12 extends from positive electrode active material 10 through the pores in the compressed Al oxide hydrate film 112 to reach Al foil 111. The distribution of conductive material 12 can be adjusted by selecting a different combination of the pre-compression thickness, the pre-compression porosity, and the compression ratio, for example.

In this way, positive electrode 100 according to the present embodiment may be produced. Positive electrode 100 may be cut into predetermined outer dimensions so as to meet the specification of battery 1000.

<Non-Aqueous Electrolyte Secondary Battery>

FIG. 4 is a schematic view illustrating the structure of the non-aqueous electrolyte secondary battery according to the present embodiment.

Battery 1000 is a non-aqueous electrolyte secondary battery. Battery 1000 includes a casing 1001. Casing 1001 is hermetically sealed. Casing 1001 is prismatic (a flat, rectangular parallelepiped). Alternatively, casing 1001 may be cylindrical, for example. Casing 1001 may be a pouch made of an aluminum-laminated film, for example.

Casing 1001 includes a container 1002 and a cap 1003. Cap 1003 is bonded to container 1002 by, for example, laser beam welding. Cap 1003 is equipped with positive electrode terminal 901 and a negative electrode terminal 902. Cap 1003 may be further equipped with a liquid inlet, a gas-discharge valve, and a current interrupt device (CID), for example. Casing 1001 accommodates an electrode array 500 and a non-aqueous electrolyte (not shown).

<<Electrode Array>>

Figure 5:
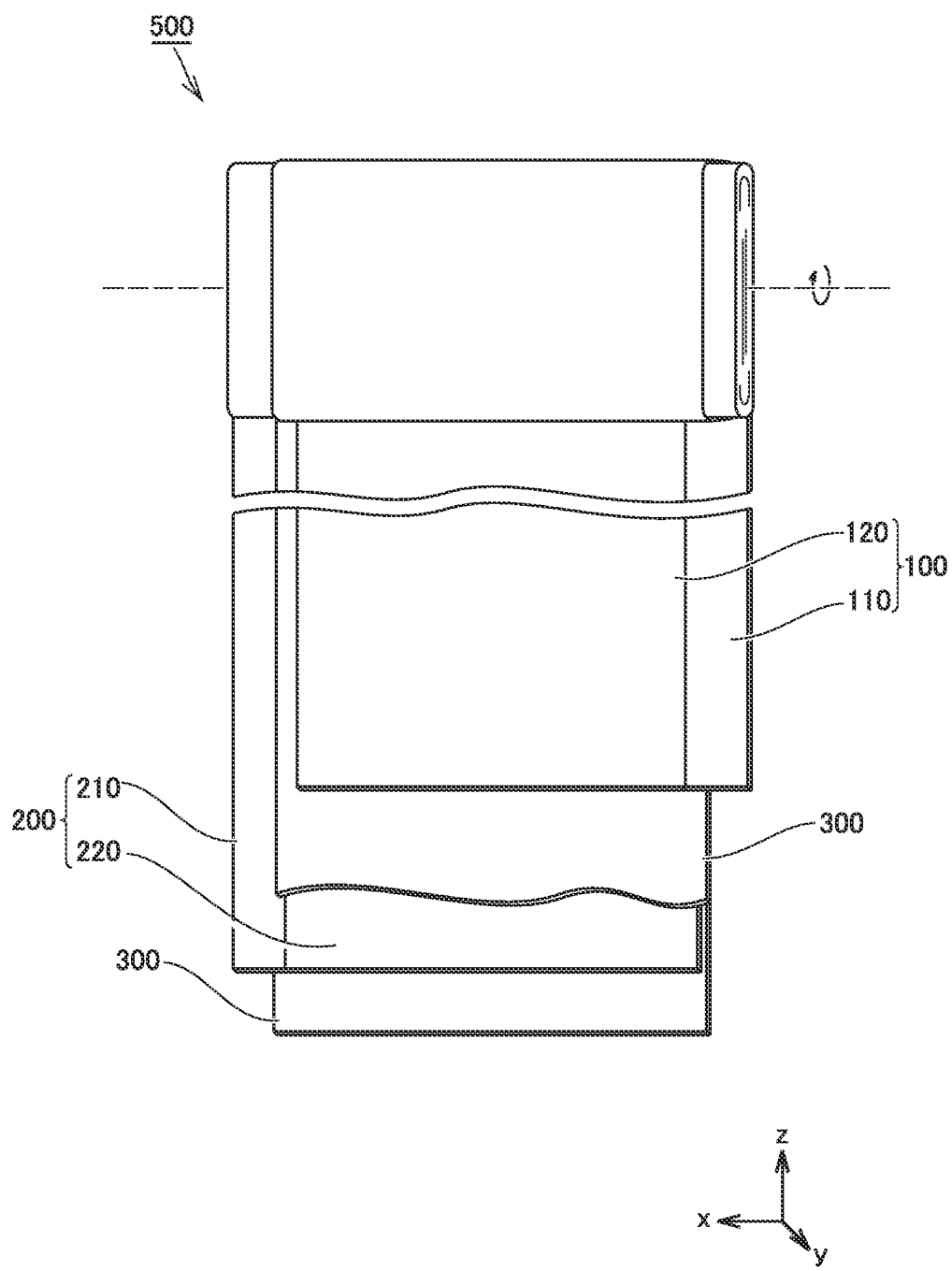
FIG. 5 is a schematic view illustrating the structure of an electrode array according to the present embodiment.

FIG. 5 is a schematic view illustrating the structure of the electrode array according to the present embodiment.

Electrode array 500 is a wound-type one. Electrode array 500 is formed by stacking positive electrode 100, one separator 300, a negative electrode 200, and another separator 300 in this order and then winding them in a spiral fashion. In other words, battery 1000 includes at least positive electrode 100. Positive electrode 100 is described above in detail. Because battery 1000 includes positive electrode 100 according to the present embodiment, heat generation occurring upon a short circuit is expected to be decreased.

Electrode array 500 may be a stack-type one. More specifically, electrode array 500 may be formed by alternately stacking one positive electrode 100 and one negative electrode 200 and then repeating this alternate stacking process more than once. In each space between positive electrode 100 and negative electrode 200, separator 300 is interposed.

<<Negative Electrode>>

Figure 6:
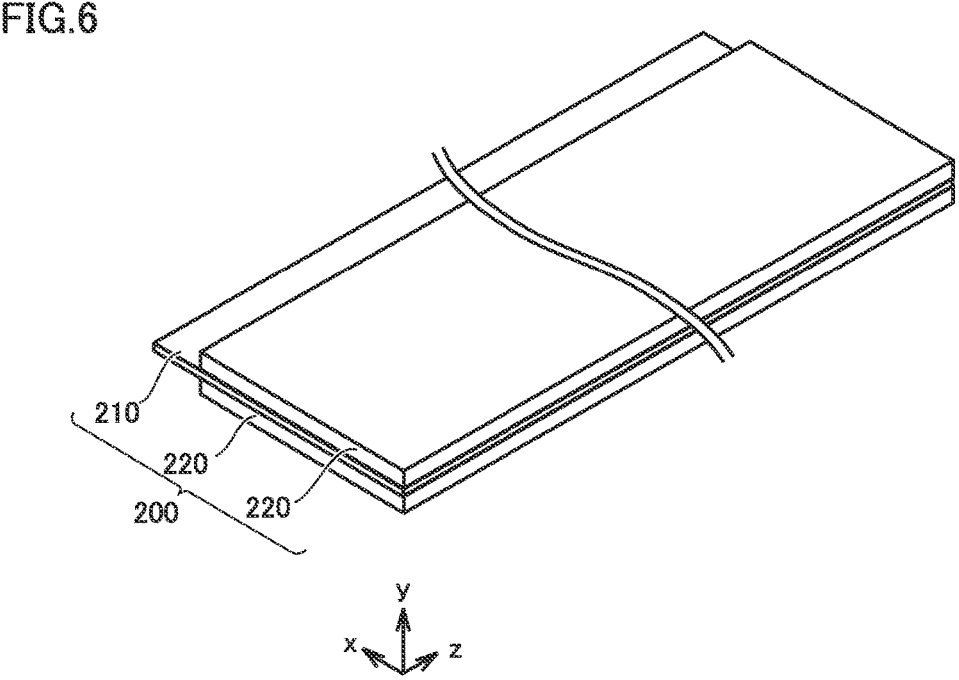
FIG. 6 is a schematic view illustrating the structure of a negative electrode according to the present embodiment.

FIG. 6 is a schematic view illustrating the structure of the negative electrode according to the present embodiment.

Battery 1000 includes at least negative electrode 200. Negative electrode 200 is in sheet form. Negative electrode 200 includes a negative electrode current collector 210 and a negative electrode composite material layer 220. Negative electrode composite material layer 220 is formed on a surface of negative electrode current collector 210. Negative electrode composite material layer 220 may be formed on both sides of negative electrode current collector 210.

Negative electrode current collector 210 may be made of copper (Cu) foil, for example. Negative electrode current collector 210 may have a thickness not smaller than 5 µm and not greater than 50 µm, for example. In FIG. 6, the part of negative electrode current collector 210 protruding from negative electrode composite material layer 220 in the x-axis direction may be used for connection to negative electrode terminal 902 (FIG. 4).

Negative electrode composite material layer 220 may have a thickness not smaller than 10 µm and not greater than 200 µm, for example. Negative electrode composite material layer 220 contains at least a negative electrode active material. Negative electrode composite material layer 220 may further contain a binder.

The negative electrode active material occludes and releases charge carriers. The negative electrode active material may have a d50 not lower than 3 µm and not higher than 30 µm, for example. The negative electrode active material is not particularly limited. The negative electrode active material may be graphite, soft carbon, hard carbon, silicon, silicon oxide, silicon-based alloy, tin, tin oxide, and/or tin-based alloy, for example. One type of the negative electrode active material may be used alone. Two or more types of the negative electrode active material may be used in combination. The binder is not particularly limited. The binder may be CMC and/or styrene-butadiene rubber (SBR), for example. The content of the binder may be, for example, not lower than 0.1 part by mass and not higher than 10 parts by mass relative to 100 parts by mass of the negative electrode active material.

<<Separator>>

Battery 1000 may include separator 300. Separator 300 is interposed between positive electrode 100 and negative electrode 200. Separator 300 is a porous film. Separator 300 is insulating. Separator 300 may have a thickness not smaller than 5 µm and not greater than 50 µm, for example.

Separator 300 may be made of polyolefin, for example. Separator 300 may be made of polyethylene (PE), for example. Separator 300 may be made of polypropylene (PP). Separator 300 may have a monolayer structure, for example. Separator 300 may consist of a porous PE film, for example. Separator 300 may have a multilayer structure, for example. Separator 300 may be formed by stacking a porous PP film, a porous PE film, and a porous PP film in this order, for example. Separator 300 may have a heat-resistant film on a surface thereof. The heat-resistant film contains a heat-resistant material. The heat-resistant material may be alumina, boehmite, titania, silica, and/or polyimide, for example.

<<Non-Aqueous Electrolyte>>

Battery 1000 includes at least a non-aqueous electrolyte. The non-aqueous electrolyte may be an electrolyte solution. The non-aqueous electrolyte may be a gelled electrolyte. The non-aqueous electrolyte may be a solid electrolyte. In the present specification, the electrolyte in the form of electrolyte solution is described as an example.

The electrolyte solution contains at least a lithium salt and a solvent. The electrolyte solution may contain the lithium salt in an amount not lower than 0.5 mol/L and not higher than 2 mol/L (not lower than 0.5 M and not higher than 2 M), for example. The lithium salt is a supporting electrolyte. The lithium salt is dissolved in the solvent. The lithium salt may be $LiPF_6$, $LiBF_4$, $Li[N(FSO_2)_2]$, and/or $Li[N(CF_3SO_2)_2]$, for example. One type of the lithium salt may be used alone. Two or more types of the lithium salt may be used in combination.

The solvent is aprotic. The solvent may be a mixture of a cyclic carbonate and a chain carbonate, for example. The mixing ratio may be "(cyclic carbonate):(chain carbonate) =1:9 to 5:5 (volume ratio)", for example.

The cyclic carbonate may be ethylene carbonate (EC), propylene carbonate (PC), butylene carbonate (BC), and/or fluoroethylene carbonate (FEC), for example. One type of the cyclic carbonate may be used alone. Two or more types of the cyclic carbonate may be used in combination.

The chain carbonate may be dimethyl carbonate (DMC), ethyl methyl carbonate (EMC), and/or diethyl carbonate (DEC), for example. One type of the chain carbonate may be used alone. Two or more types of the chain carbonate may be used in combination.

The solvent may contain a lactone, a cyclic ether, a chain ether, and/or a carboxylic acid ester, for example. The lactone may be γ-butyrolactone (GBL) and/or δ-valerolactone, for example. The cyclic ether may be tetrahydrofuran (THF), 1,3-dioxolane, and/or 1,4-dioxane, for example. The chain ether may be 1,2-dimethoxyethane (DME), for example. The carboxylic acid ester may be methyl formate (MF), methyl acetate (MA), and/or methyl propionate (MP), for example.

The electrolyte solution may further contain various functional additives in addition to the lithium salt and the solvent. The electrolyte solution may contain the functional additives in an amount not lower than 1 mass % and not higher than 5 mass %, for example. Examples of the functional additives include a gas generation agent (anti-overcharging additive) and a solid electrolyte interface (SEI) film-forming agent. The gas generation agent may be cyclohexylbenzene (CHB) and/or biphenyl (BP), for example. The SEI-film-forming agent may be vinylene carbonate (VC), vinylethylene carbonate (VEC), $Li[B(C_2O_4)_2]$, $LiPO_2F_2$, propane sultone (PS), and/or ethylene sulfite (ES), for example.

EXAMPLES

In the following, examples according to the present disclosure are described. The scope of claims is not limited to the description below.

<Production of Positive Electrode>

Example 1

1-1. (a) Preparation of Al Foil

Al foil 111 (Alloy No. 1085, with a thickness of 15 μm) was prepared. The width dimension of Al foil 111 (dimension in the x-axis direction in FIG. 1) was 130 mm.

1-2. (b) Hydrothermal Treatment

A hydrothermal-treatment bath was prepared. As a hydrothermal-treatment liquid, ion-exchanged water was used. The temperature of the hydrothermal-treatment liquid was 90° C. In the hydrothermal-treatment liquid, Al foil 111 was immersed for two minutes. Thus, Al oxide hydrate film 112 was formed on a surface of Al foil 111. In other words, positive electrode current collector 110 was formed. Al oxide hydrate film 112 had a thickness of 180 nm.

1-3. (c) Disposition of Conductive Material and Positive Electrode Active Material The materials described below were prepared.

Positive electrode active material 10: lithium-nickel composite oxide

Conductive material 12: acetylene black (powder)

Binder: PVdF

Solvent: NMP

Positive electrode active material 10, conductive material 12, the binder, and the solvent were mixed, and thus a paste was prepared. The paste was applied to the surface (both sides) of positive electrode current collector 110, followed by drying, and thus positive electrode composite material layer 120 was formed. In other words, conductive material 12 and positive electrode active material 10 were disposed on the surface of positive electrode current collector 110. Positive electrode composite material layer 120 had the following composition:

(positive electrode active material):(conductive material):(binder)=98:1:1 (mass ratio).

Positive electrode composite material layer 120 had a weight per unit area (mass per unit area) of 25 mg/cm². Positive electrode composite material layer 120 had a width dimension (dimension in the x-axis direction in FIG. 1) of 110 mm.

1-4. (d) Compression

Rollers were prepared. The rollers were used to compress positive electrode current collector 110 and positive electrode composite material layer 120 together. More specifically, conductive material 12, positive electrode active material 10, and positive electrode current collector 110 were compressed together. The linear pressure of the rollers was 11 t/cm. The compressed positive electrode composite material layer 120 had a density of 3.7 g/cm³. In this way, positive electrode 100 was produced.

The thickness, the porosity, and the composition of Al oxide hydrate film 112 were determined by the above methods. Results are shown in Table 1 below. The SEM image of a cross section shows that part of conductive material 12 was disposed within pores in Al oxide hydrate film 112.

Examples 2 to 14

Positive electrode 100 was produced in the same manner as in Example 1 except that hydrothermal treatment conditions were changed as specified in Table 1 below. In Examples 12 to 14, dilute sulfuric acid was used as the hydrothermal-treatment liquid. The dilute sulfuric acid was prepared by adding sulfuric acid to ion-exchanged water.

Comparative Example 1

Al foil 111 was subjected to hydrothermal treatment under the hydrothermal treatment conditions specified in Table 1 below. As a result, substantially no Al oxide hydrate film 112 was formed under those conditions. Subsequently, positive electrode 100 was produced in the same manner as in Example 1.

Comparative Example 2

Positive electrode 100 was produced in the same manner as in Example 1 except that Al foil 111 was not subjected to hydrothermal treatment.

Comparative Examples 3 to 5

Positive electrode 100 was produced in the same manner as in Example 1 except that hydrothermal treatment conditions and compression conditions were changed as specified in Table 1 below.

<Production of Non-Aqueous Electrolyte Secondary Battery>

2. Production of Negative Electrode

The materials described below were prepared.
Negative electrode active material: natural graphite
Binder: CMC and SBR
Solvent: ion-exchanged water
Negative electrode current collector 210: Cu foil (10 μm in thickness and 132 mm in width dimension)

The width dimension refers to the dimension in the x-axis direction in FIG. 6.

The negative electrode active material, the binder, and the solvent were mixed, and thus a paste was prepared. The resulting paste was applied to the surface (both sides) of negative electrode current collector 210, followed by drying, and thus negative electrode composite material layer 220 was formed. The weight per unit area of negative electrode composite material layer 220 was 20 mg/cm². The width dimension (dimension in the x-axis direction in FIG. 6) of negative electrode composite material layer 220 was 112 mm. In this way, negative electrode 200 was produced.

3. Preparation of Separator

A porous PE film (120 mm in width dimension and 20 μm in thickness) was prepared. As a heat-resistant material, alumina was prepared. The heat-resistant material, a binder, and a solvent were mixed, and a paste was prepared. The resulting paste was applied to a surface of separator 300, followed by drying, and thus a heat-resistant film was formed. The resulting heat-resistant film had a thickness of 4 μm. In this way, separator 300 was prepared.

4. Preparation of Electrolyte Solution

An electrolyte solution was prepared. The electrolyte solution had a composition described below.
Lithium salt: $LiPF_6$ (1 mol/L)
Solvent: [EC:EMC:DEC=3:4:3 (volume ratio)]

5. Assembling

Positive electrode 100, separator 300, negative electrode 200, and separator 300 were stacked in this order and then wound in a spiral fashion. Thus, electrode array 500 was formed.

Casing 1001 was prepared. Casing 1001 was prismatic. Casing 1001 had outer dimensions of 75 mm in height dimension, 120 mm in width dimension, and 15 mm in depth dimension. The height dimension is the dimension in the z-axis direction in FIG. 4. The width dimension is the dimension in the x-axis direction in FIG. 4. The depth dimension is the dimension in the y-axis direction in FIG. 4. Casing 1001 had a wall thickness of 1 mm.

In casing 1001, electrode array 500 was placed. Into casing 1001, the electrolyte solution was injected. Casing 1001 was hermetically sealed. Thus, battery 1000 (non-aqueous electrolyte secondary battery) was produced. Battery 1000 was designed to have a rated capacity of 5 Ah within a voltage range from 3.0 to 4.1 V.

6. Charge and Discharge for Completing Battery Production

Under an environment at 25° C., battery 1000 was charged to 4.2 V at a rate of 1 C. At a rate of "1 C", charging to the rated capacity completes in one hour. After five minutes of resting, battery 1000 was discharged to 3.0 V at a rate of 1 C.

Then, the initial capacity of battery 1000 was determined by carrying out charging in the constant current constant voltage (CC-CV) mode and discharging in the CC-CV mode described below.

Charging in CC-CV mode: CC=1 C, CV=4.1 V, cut-off current=0.01 C
Discharging in CC-CV mode: CC=1 C, CV=3.0 V, cut-off current=0.01 C <Evaluation>

<<Nail Penetration Test>>

The state of charge (SOC) of battery 1000 was adjusted to 100%. A nail was prepared. The nail had a shank diameter of 3 mm and an R value of 1 mm at the tip. The nail was driven into battery 1000 at a rate of 1 mm/s. The maximum temperature to which the temperature of battery 1000 reached was measured. The maximum temperature refers to the surface temperature of battery 1000 one second after the nail was driven into battery 1000. The maximum temperature is shown in Table 1 below. It is considered that the lower the maximum temperature is, the greater the reduction is in heat generation that occurs in the battery upon a short circuit caused by an impact exerted from outside the battery.

<<Battery Resistance>>

The SOC of battery 1000 was adjusted to 50%. Battery 1000 was discharged at a rate of 10 C for ten seconds. The level of voltage drop caused in that ten seconds elapsed after the start of the discharging was measured. Based on the relationship between the level of voltage drop and the rate, the battery resistance was calculated. The battery resistance is shown in Table 1 below. It is considered that the lower the battery resistance is, the better the electronic conduction between Al foil 111 and positive electrode active material 10 is.

TABLE 1

List of Examples and Comparative Examples

| | Hydrothermal treatment conditions | | | Compression conditions | Al oxide hydrate film | | |
| --- | --- | --- | --- | --- | --- | --- | --- |
| | Hydrothermal-treatment liquid | Temp. [° C.] | Duration of immersion [min] | Linear pressure [t/cm] | Before compression Thickness [nm] | After compression Thickness [nm] | Compression ratio [—] |
| Ex. 1 | Ion-exchanged water | 90 | 2 | 11 | 180 | 100 | 0.56 |
| Ex. 2 | Ion-exchanged water | 70 | 2 | 11 | 140 | 100 | 0.71 |
| Ex. 3 | Ion-exchanged water | 80 | 2 | 11 | 160 | 100 | 0.63 |
| Ex. 4 | Ion-exchanged water | 100 | 2 | 11 | 200 | 100 | 0.50 |
| Ex. 5 | Ion-exchanged water | 90 | 1 | 11 | 90 | 50 | 0.56 |
| Ex. 6 | Ion-exchanged water | 90 | 0.1 | 11 | 18 | 10 | 0.56 |
| Ex. 7 | Ion-exchanged water | 90 | 0.2 | 11 | 36 | 20 | 0.56 |
| Ex. 8 | Ion-exchanged water | 90 | 0.3 | 11 | 54 | 30 | 0.56 |
| Ex. 9 | Ion-exchanged water | 90 | 4 | 11 | 360 | 200 | 0.56 |
| Ex. 10 | Ion-exchanged water | 90 | 6 | 11 | 540 | 300 | 0.56 |
| Ex. 11 | Ion-exchanged water | 90 | 10 | 11 | 900 | 500 | 0.56 |

TABLE 1-continued

List of Examples and Comparative Examples

| | | | | | | | |
|---|---|---|---|---|---|---|---|
| Ex. 12 | Dilute sulfuric acid (1 mass %) | 90 | 2 | 11 | 150 | 100 | 0.67 |
| Ex. 13 | Dilute sulfuric acid (3 mass %) | 90 | 2 | 11 | 120 | 100 | 0.83 |
| Ex. 14 | Dilute sulfuric acid (5 mass %) | 90 | 2 | 11 | 110 | 100 | 0.91 |
| Comp. Ex. 1 | Ion-exchanged water | 60 | 2 | 11 | 0 | — | — |
| Comp. Ex. 2 | No treatment | — | — | 11 | 0 | — | — |
| Comp. Ex. 3 | Ion-exchanged water | 90 | 0.05 | 11 | 9 | 5 | 0.56 |
| Comp. Ex. 4 | Dilute sulfuric acid (7 mass %) | 90 | 2 | 11 | 105 | 100 | 0.95 |
| Comp. Ex. 5 | Ion-exchanged water | 90 | 2 | 10 | 180 | 110 | 0.61 |

| | Al oxide hydrate film | | Composite material | Evaluation | |
|---|---|---|---|---|---|
| | $Al_2O_3 \cdot nH_2O$ n [—] | Porosity [%] | layer Density [g/cm$^3$] | Battery resistance [mΩ] | Nail penetration test Maximum temperature [° C.] |
| Ex. 1 | 1 | 45 | 3.7 | 3.5 | 300 |
| Ex. 2 | 1 | 30 | 3.7 | 3.5 | 295 |
| Ex. 3 | 1 | 40 | 3.7 | 3.5 | 298 |
| Ex. 4 | 1 | 50 | 3.7 | 3.5 | 350 |
| Ex. 5 | 1 | 45 | 3.7 | 3.5 | 300 |
| Ex. 6 | 1 | 45 | 3.7 | 3.5 | 330 |
| Ex. 7 | 1 | 45 | 3.7 | 3.5 | 320 |
| Ex. 8 | 1 | 45 | 3.7 | 3.5 | 310 |
| Ex. 9 | 1 | 45 | 3.7 | 3.5 | 300 |
| Ex. 10 | 1 | 45 | 3.7 | 3.5 | 300 |
| Ex. 11 | 1 | 45 | 3.7 | 3.6 | 300 |
| Ex. 12 | 0.9 | 35 | 3.7 | 3.5 | 300 |
| Ex. 13 | 0.8 | 23 | 3.7 | 3.5 | 300 |
| Ex. 14 | 0.7 | 10 | 3.7 | 3.5 | 300 |
| Comp. Ex. 1 | — | — | 3.7 | 3.5 | 700 |
| Comp. Ex. 2 | — | — | 3.7 | 3.5 | 700 |
| Comp. Ex. 3 | 1 | 45 | 3.7 | 3.5 | 600 |
| Comp. Ex. 4 | 0.6 | 5 | 3.7 | 5.2 | 700 |
| Comp. Ex. 5 | 1 | 60 | 3.0 | 3.5 | 600 |

<Results>

Figure 7:
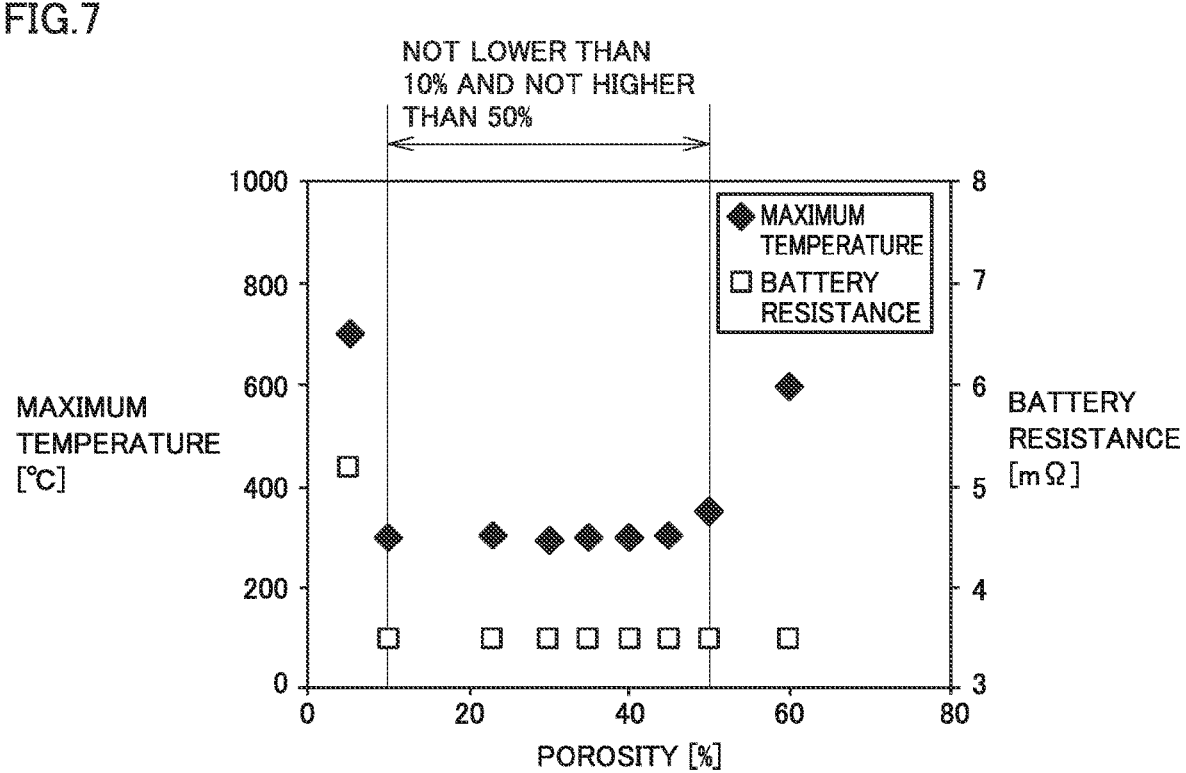
FIG. 7 is a graph showing both a maximum temperature determined in a nail penetration test and a battery resistance in relation to the porosity of an Al oxide hydrate film.

FIG. 7 is a graph showing both a maximum temperature determined in a nail penetration test and a battery resistance in relation to the porosity of the Al oxide hydrate film. When the porosity was within the range from 10% to 50%, heat generation tended to be small. When the porosity was 60%, heat generation was great. The reason is considered to be that Al oxide hydrate film 112 was not dense. When the porosity was 5%, the battery had a high resistance. The reason is considered to be that conductive material 12 was less likely to be disposed within the pores. When the porosity was 5%, heat generation was great. The reason is considered to be that Al oxide hydrate film 112 was too dense and therefore cracks larger than the width of primary particles 11 (positive electrode active material 10) were formed during the compression process.

Figure 8:
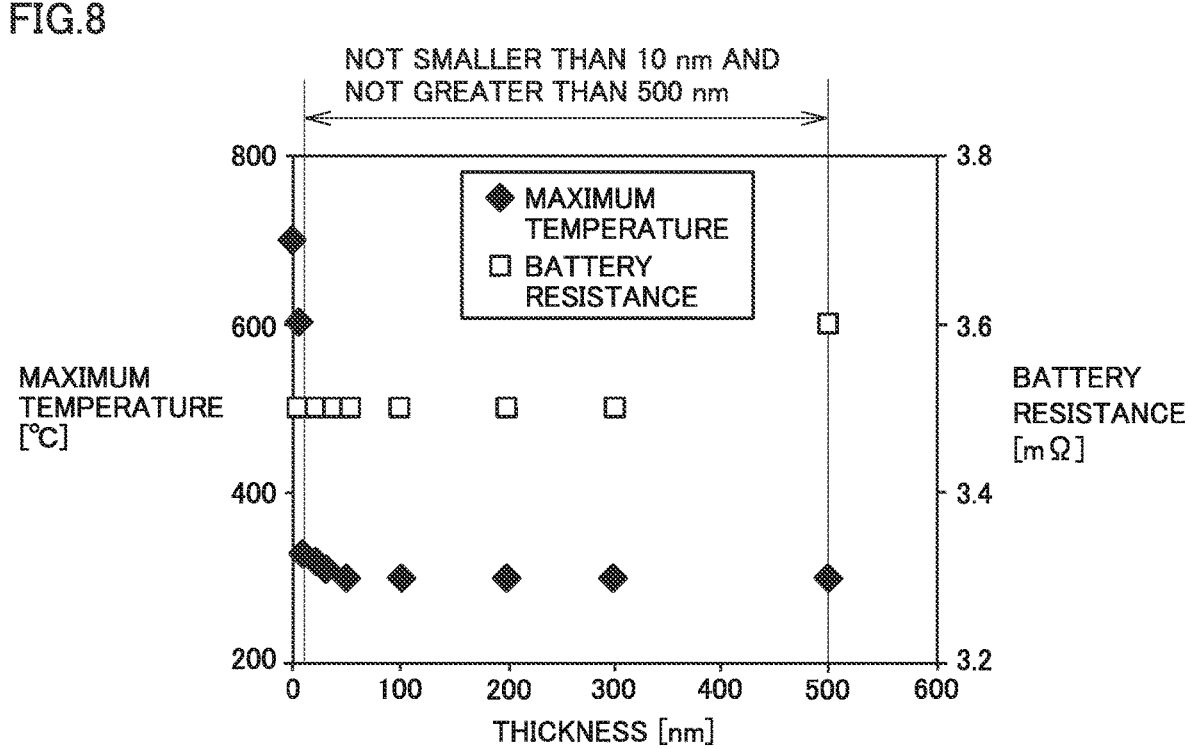
FIG. 8 is a graph showing both a maximum temperature determined in a nail penetration test and a battery resistance in relation to the thickness of an Al oxide hydrate film.

FIG. 8 is a graph showing both a maximum temperature determined in a nail penetration test and a battery resistance in relation to the thickness of the Al oxide hydrate film. When the thickness was within the range from 10 nm to 500 nm, heat generation tended to be small. When the thickness was not smaller than 50 nm, heat generation tended to be even smaller. When the thickness was 5 nm, heat generation was great. The reason is considered to be that Al oxide hydrate film 112 was not dense. When the thickness was not greater than 300 nm, the battery resistance tended to be low.

The embodiments and examples disclosed herein are illustrative and non-restrictive in any respect. The technical scope indicated by the claims is intended to include any modifications within the scope and meaning equivalent to the terms of the claims.

What is claimed is:

1. A non-aqueous electrolyte secondary battery, comprising a positive electrode comprising at least:
   a positive electrode current collector; and
   a positive electrode composite material layer including a conductive material and a positive electrode active material,
   the positive electrode composite material layer being disposed on a surface of the positive electrode current collector, the positive electrode current collector comprising an aluminum foil and an aluminum oxide hydrate film,
the positive electrode composite material layer being in direct contact with a surface of the aluminum oxide hydrate film,
the aluminum oxide hydrate film covering a surface of the aluminum foil,
the aluminum oxide hydrate film having a thickness not smaller than 10 nm and not greater than 500 nm,
the aluminum oxide hydrate film having a porosity not lower than 10% and not higher than 50%, and
at least part of the conductive material being disposed within pores that are formed in the aluminum oxide hydrate film.

2. The non-aqueous electrolyte secondary battery according to claim 1, wherein at least part of the conductive material extends from the positive electrode active material through the pores in the aluminum oxide hydrate film to reach the aluminum foil.

3. The non-aqueous electrolyte secondary battery according to claim 1, wherein the aluminum oxide hydrate film consists essentially of a compound represented by the following formula (I):

$$Al_2O_3 \cdot nH_2O \qquad (I)$$

where n satisfies $0 < n \leq 1$.

4. The non-aqueous electrolyte secondary battery according to claim 3, where n in the above formula (I) satisfies $0.7 \leq n < 1$.

5. The non-aqueous electrolyte secondary battery according to claim 1, wherein the aluminum oxide hydrate film has a thickness not smaller than 50 nm and not greater than 300 nm.

6. The non-aqueous electrolyte secondary battery according to claim 1, wherein the positive electrode active material comprises a lithium-nickel composite oxide.

7. A method of producing a non-aqueous electrolyte secondary battery according to claim 1, the method comprising at least:
preparing an aluminum foil;
forming an aluminum oxide hydrate film on a surface of the aluminum foil by hydrothermal treatment to form a positive electrode current collector;
disposing a positive electrode composite material layer including a conductive material and a positive electrode active material on a surface of the positive electrode current collector; and
after the disposition of the positive electrode composite material layer, compressing the positive electrode composite material layer, and the positive electrode current collector together,
the positive electrode composite material layer being in direct contact with a surface of the aluminum oxide hydrate film,
the compressed aluminum oxide hydrate film having a thickness not smaller than 10 nm and not greater than 500 nm,
the compressed aluminum oxide hydrate film having a porosity not lower than 10% and not higher than 50%, and
by the compressing, at least part of the conductive material being disposed within pores that are formed in the aluminum oxide hydrate film.

8. The method of producing a non-aqueous electrolyte secondary battery according to claim 7, wherein the conductive material, the positive electrode active material, and the positive electrode current collector are compressed together so that at least part of the conductive material extends from the positive electrode active material through the pores in the compressed aluminum oxide hydrate film to reach the aluminum foil.

9. A positive electrode for a non-aqueous electrolyte secondary battery, the positive electrode comprising at least:
a positive electrode current collector; and
a positive electrode composite material layer including a conductive material and a positive electrode active material,
the positive electrode composite material layer being disposed on a surface of the positive electrode current collector,
the positive electrode current collector comprising an aluminum foil and an aluminum oxide hydrate film,
the positive electrode composite material layer being in direct contact with a surface of the aluminum oxide hydrate film,
the aluminum oxide hydrate film covering a surface of the aluminum foil, the aluminum oxide hydrate film having a thickness not smaller than 10 nm and not greater than 500 nm,
the aluminum oxide hydrate film having a porosity not lower than 10% and not higher than 50%,
at least part of the conductive material being disposed within pores that are formed in the aluminum oxide hydrate film,
the pores have a width W1 that is greater than the width W2 of the conductive material and is smaller than the width W3 of the positive electrode active material.

10. The non-aqueous electrolyte secondary battery according to claim 1, wherein the aluminum oxide hydrate film has a thickness not smaller than 100 nm.

* * * * *